United States Patent
Lewis et al.

[15] 3,665,500
[45] May 23, 1972

[54] VARIABLE MODE FEEDBACK CONTROL SYSTEM

[72] Inventors: Martyn A. Lewis, Los Angeles; Siegfried Domin, Woodland Hills, both of Calif.

[73] Assignee: SLI Industries, Van Nuys, Calif.

[22] Filed: Apr. 1, 1970

[21] Appl. No.: 24,671

[52] U.S. Cl. .............................. 318/596, 318/599, 330/112
[51] Int. Cl. .................................................. G05b 11/18
[58] Field of Search .............. 318/596, 599; 330/112; 331/59

[56] References Cited

UNITED STATES PATENTS

| 3,364,405 | 1/1968 | Henderson | 318/596 X |
| 3,419,775 | 12/1968 | Kardos | 318/596 |
| 3,436,635 | 4/1969 | James et al | 318/599 X |

Primary Examiner—Benjamin Dobeck
Attorney—Fulwider, Patton, Rieber, Lee & Utecht

[57] ABSTRACT

Apparatus selectively and automatically operable in either a linear or a pulse-width modulation mode. A controlled feedback loop in a basically linear system is automatically closed in response to threshold conditions of particular parameters of a moving inductance type load, the loop providing positive feedback in a range of frequencies determined by the phase shift characteristics of the load and additional phase shift circuits. The positive feedback results in a controlled oscillatory condition producing a pulse-width modulation mode for the system.

26 Claims, 2 Drawing Figures

INVENTORS
MARTYN A. LEWIS
SIEGFRIED DOMIN
BY Zulwider, Patton, Rieber
Lee, and Utecht
ATTORNEYS

VARIABLE MODE FEEDBACK CONTROL SYSTEM

BACKGROUND OF THE INVENTION

1. Field of the Invention

The present invention relates generally to feedback control systems and, more particularly, to a control system which is selectively operable in either a linear or a pulse-width modulation mode depending on predetermined system parameters.

2. Description of the Prior Art

Many servomechanism systems incorporate electromechanical actuators which include moving inductances, for example, the "voice coil" type linear position actuator for magnetic disc memory systems or the d.c. motor of magnetic tape memory systems. Conventional design techniques for servomechanisms employing moving inductance type actuators usually require that a relatively high, substantially constant current be applied to the inductance under certain conditions such as when a linear actuator is required to make a relatively large positional change or when a d.c. motor is to be started. When the linear actuator nears its new commanded position, or when the motor reaches its final velocity, the current required is normally relatively low.

The high, substantially constant current requirement for an inductive load presents a problem in the design of the control system power amplifiers in that, during the start-up or initial acceleration of the actuator, a relatively high current is supplied to the inductance but very little voltage appears across it so that practically the entire power supply voltage must appear across the active elements (modernly, transistors) of the amplifier. After the actuator has achieved an appreciable linear or rotational velocity, the counter e.m.f. generated in the inductance is only slightly lower than the power supply voltage, so that very little voltage then appears across the active elements of the amplifier for substantially the same current through the inductance. It will be appreciated that, with a relatively high current through, and practically the entire power supply voltage across, the active elements of the amplifier during the start-up or initial acceleration of the actuator, the power dissipation rating of those elements can easily be exceeded.

While it is possible to design a power amplifier with active elements which have adequate power dissipation ratings for the aforedescribed conditions of operation, such amplifiers are relatively expensive, and alternative schemes have been employed to supply the relatively high, substantially constant current to inductive loads during initial acceleration without exceeding the power dissipation ratings of the active elements in the amplifier. Among the alternative schemes utilized is a pulse-width modulation mode of operation so that the average power transferred to the load can be high but the active elements are rapidly switched from their "ON" to "OFF" states, both of which are relatively low power dissipation conditions, as is well known in the art. However, it is also well known that, when a power amplifier is operated in a pulse-width modulation mode with an inductive load, the voltage pulses developed across the inductance when the current switches on and off periodically charge the filter capacitors of the amplifier power supply until they fail. The amplifier and load must normally be placed in a bridge type circuit configuration in order to prevent overcharging the filter capacitors. Obviously, the necessity of operating the system in a bridge configuration greatly increases the cost of the power amplifier and also increases the difficulty of obtaining reliable indications of the parameters of the necessarily "floating" inductive load.

Additionally, the switching transients developed when the power amplifier is operated in the pulse-width modulation mode cause noise which interferes with the proper operation of nearby electronic equipment such as the read and write sections of a memory system in which the actuator may be used.

Thus, there has long been a need for a feedback control system for driving a moving inductance type actuator which has the power dissipation characteristics of a pulse-width modulation system but which has the desirable features of a linear control system in that it does not require operation in a bridge configuration or produce noise when data is being read or written.

SUMMARY OF THE INVENTION

Basically, the present invention provides a feedback control system which is selectively and automatically operable in either a linear or pulse-width modulation mode. The system switches between the linear and pulse-width modulation modes as system parameters indicate respective low and high power dissipation situations for the power amplifier of the system. The control system of the present invention may then be economically and advantageously designed using relatively low power dissipation active elements in the power amplifier.

The present invention is used to great advantage in moving inductance type actuator systems, such as a voice coil linear actuator, by operating the control system in the pulse-width modulation mode only when the actuator is to be moved a relatively large distance from an initial, substantially stationary position and a relatively large, substantially constant driving current is required. In magnetic disc memory systems, data is normally not being read or written in such situations so the noise and interference problem does not occur. In a magnetic tape memory system, the control system is operated in the pulse-width modulation mode only when the d.c. motor is accelerated to, or decelerated from, a constant velocity. Again, data is normally not read or written during such times so the noise and interference problems do not occur.

A presently preferred embodiment of the feedback control system of the present invention is designed for use with a voice coil type linear actuator in a magnetic disc memory system. The system generally has a conventional feedback control amplifier which includes an additional controlled feedback loop for selectively and automatically causing the system to go into a controlled oscillatory condition to produce the pulse-width modulation mode. The pulse-width modulation mode is initiated under predetermined conditions for particular parameters of the system and the range of frequencies of oscillation is determined by the phase shift characteristics of the inductive load and additional phase shift networks within the amplifier. The exact frequency of oscillation and, consequently, the average power delivered to the load is determined by the condition of particular system parameters, just as in the linear mode.

In practical magnetic disc or tape memory systems, a feedback control system embodying the present invention is operated in the pulse-width modulation mode for only brief periods so that the problem of overcharging the power supply filter capacitors mentioned above is substantially inconsequential for such a system. Further, in linear actuator systems, the acceleration and deceleration times between positions are practically equal and, since the charge buildup is opposite for acceleration and deceleration, the average charge buildup is substantially zero. Therefore, the pulse-width modulation mode may be utilized without operating the system in a bridge configuration.

In summary, the feedback control system of the present invention automatically switches between a linear and a pulse-width modulation mode as the power dissipation requirements of the system change. The system may then be economically constructed with relatively low power dissipation components. Additionally, in the applications for which the system is principally intended, the pulse-width modulation mode may be achieved for an inductive load without operating the system in a bridge configuration.

DESCRIPTION OF THE PREFERRED EMBODIMENT

Figure 1:
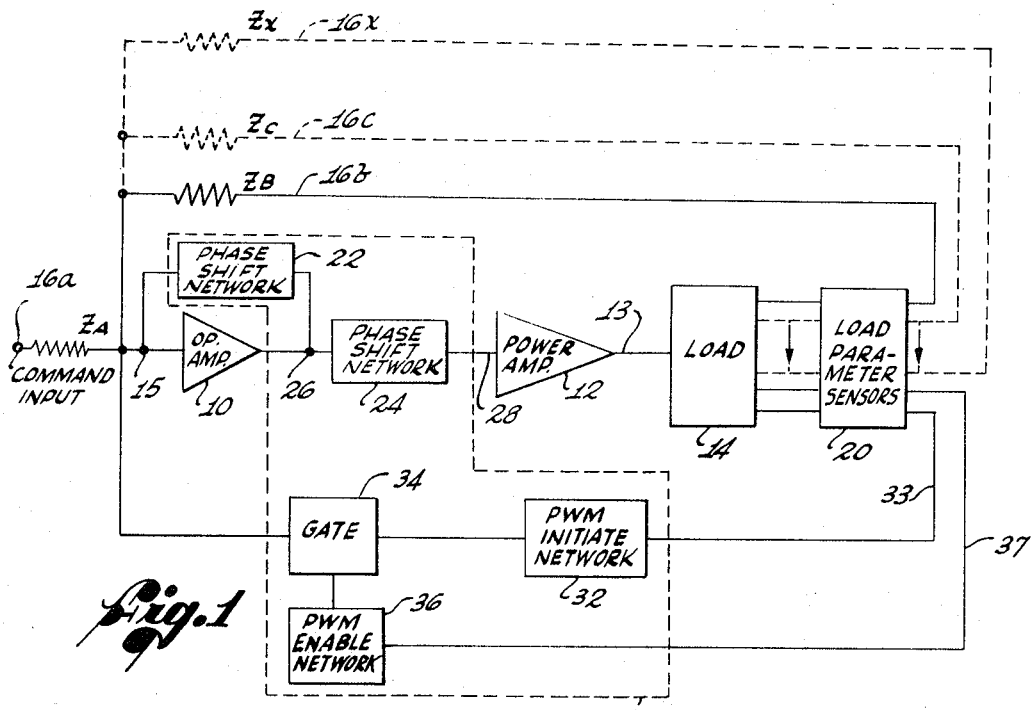
FIG. 1 is a combined block diagram and electrical schematic of a feedback control system in accordance with the present invention and showing the main elements of a preferred embodiment thereof.

Turning now to the drawings, FIG. 1 illustrates the variable mode feedback control system of the present invention. Generally, the system includes an operational amplifier 10 connected to a power amplifier 12, both of which are of conventional design. An output 13 of the power amplifier drives a load 14 which is usually an electromechanical device such as a linear actuator or a d.c. motor, as discussed above.

In accordance with conventional feedback control system theory, the input to the operational amplifier 10 is formed at a summing point 15 and is the sum of both a command input 16a fed through a generalized input resistance $A_A$, and a plurality of negative feedback inputs 16b, 16c,..., 16x, fed through the generalized feedback impedances $Z_B$, $Z_C$,... $Z_X$. The algebraic sum of the feedback signals from the command input 16a and the feedback inputs, 16b, 16c,..., 16x, forms an error signal at the summing point which is proportional to the difference between the desired condition of the load 14 and its instantaneous condition.

The various feedback inputs, 16b, 16c,..., 16x, of the illustrative system of FIG. 1 are shown, for convenience, as being derived only from a plurality of load parameter sensors 20 which indicate the various conditions of the load 14, but it will be appreciated that feedback inputs may be derived from other signal sources for various applications of the system of the present invention. It is also contemplated that the generalized input impedance $Z_A$ and the generalized feedback impedances $Z_B$, $Z_C$,..., $Z_X$, may be relatively complicated linear, or nonlinear, transfer functions in a modern feedback control system.

A first phase shift network 22 is (in FIG. 1) connected between an output 26 of the operational amplifier 10 and the summing point 15, and a second phase shift network 24 is connected between the output of the operational amplifier and an input 28 to the power amplifier 12. The phase shift and attenuation characteristics of these networks 22, 24 are chosen to be effective only at relatively high frequencies. Therefore, when the feedback control system is operating in the substantially direct current linear mode, the networks 22, 24 have little effect on the operation of the system and, for particular applications, can even be designed to enhance its stability.

The feedback control system of the present invention includes an additional controlled feedback loop 30 which may be considered to be open under normal conditions. The normal conditions will of course be dependent upon the type of system such as a particular position for a linear actuator in a magnetic disc memory system or a constant speed for a d.c. motor in a magnetic tape memory system.

In accordance with the present invention, the controlled feedback loop 30 is closed only when the conditions of the parameters of the system indicate that the pulse-width modulation mode is desirable to prevent exceeding the power dissipation ratings of the active elements in the power amplifier 12, such as when the linear actuator is moved a relatively large distance or when the d.c. motor is started or stopped. When the controlled feedback loop 30 is closed, the feedback control system of the present invention goes into a pulse-width modulation mode, thereby causing the active elements in the power amplifier 12 to switch rapidly between their low power dissipation "ON" and "OFF" states.

Generally, the controlled feedback loop 30 of the control system of FIG. 1 includes a pulse-width modulation (designated PWM in the drawings) initiate network 32 connected to a particular feedback line 33 from the parameter sensors 20 for the load 14. The initiate network 32 is selectively connected to the summing point 15 of the operational amplifier 10 through a controlled gate 34 so that the initiate network is normally disconnected from the summing point. Generally, it is contemplated that the feedback signal on the line 33 which is connected to the initiate network 32 will be indicative of the primary controlled parameter of the system, for example, the driving current through a linear actuator or d.c. motor.

In order to determine when the controlled feedback loop 30 should be closed, the gate 34 is selectively activated by at least one pulse-width modulation enable network 36 which is in turn, connected to the sensors 20 by another feedback line 37 which carries signals indicative of particular parameters which may be used to determine whether the pulse-width modulation mode is desirable in a particular system. For example, in a linear actuator system, any appreciable indication of velocity of the actuator usually means that a large positional change has been commanded which would require a large driving current while, in a d.c. motor drive, an indication of acceleration or deceleration would be the appropriate parameter.

Whichever suitable parameters are chosen, when that parameter, or combination of parameters, reaches a predetermined condition, the gate 34 is activated to close the controlled feedback loop 30 through the initiate network 32. Then, whether or not the feedback control system switches to the pulse-width modulation mode is dependent upon the condition of the signal on the feedback line 33 connected to the initiate network 32. For example, if the current through a linear actuator or a d.c. motor goes above a certain threshold level, where the power rating of the active elements in the power amplifier 12 may be exceeded, the initiate network 32 is activated and the pulse-width modulation mode is initiated.

The primarily inductive load 14 contemplated for use with the feedback control system of the present invention introduces a relatively large phase shift between the voltage and current in the load and the phase shift networks 22, 24 introduce additional predetermined phase shifts at particular frequencies, as is well known in the feedback control system art. The configuration of the phase shift networks 22, 24 are chosen so that, for a predetermined range of frequencies, the phase shift approaches 180° and the feedback signal becomes positive. The configuration of the initiate network 32 is chosen so that the feedback signal through the controlled feedback loop 30 is of relatively high magnitude, causing the system to go into oscillation. The active elements of the power amplifier 12 are then driven rapidly between their "ON" and "OFF" conditions so that their power dissipation is relatively low, in accordance with conventional transistor switching theory.

As discussed above, the signal on the feedback line 33 for the controlled feedback loop 30 is preferably derived from the primary controlled parameter, which then has some controlling effect on the exact frequency of oscillation within the range determined by the load 14 phase shift and the phase shift networks 22, 24. The range of frequencies of oscillation is chosen to be substantially higher than the bandwidth of the complete system, which is principally limited by the frequency characteristics of the load 14, so that the rapid switching of the active elements of the power amplifier 12 is smoothed and averaged in the load. The particular primary controlled parameter sensor then continues to indicate the average value of that parameter. The configuration of the phase shift networks 22, 24 can be chosen so that the average value of the primary controlled parameter is not substantially changed due to the switching from the linear to the pulse-width modulation mode.

The feedback control system of the present invention continues to function in the pulse-width modulation mode until the various parameters of the system are such that the pulse-width modulation mode is no longer desirable. For example, if the load 14 were a linear actuator, the slowing of the actuator to approximately its new position, as indicated by appropriate feedback signals, would result in the lowering of the current through the actuator and the lowering of the velocity parameter until either the initiate network 32 or the enable network 36 would open the controlled feedback loop 30, switching the system back into the linear mode. It is contemplated that the system would switch back to the linear mode when the electronic noise generated by the pulse-width modulation mode would no longer be tolerable such as when the linear actuator is in a new position or when the d.c. motor has substantially reached the operating velocity.

Thus, it can be seen that the feedback control system of the present invention can be operated in either the pulse-width modulation mode or the linear mode depending on a great number of parameters and desired operating conditions. While the illustrative system shown in FIG. 1 has been discussed principally with reference to a moving inductance type load 14, it should be appreciated that the inventive principles described may be equally applicable to a wide variety of loads and systems.

Figure 2:
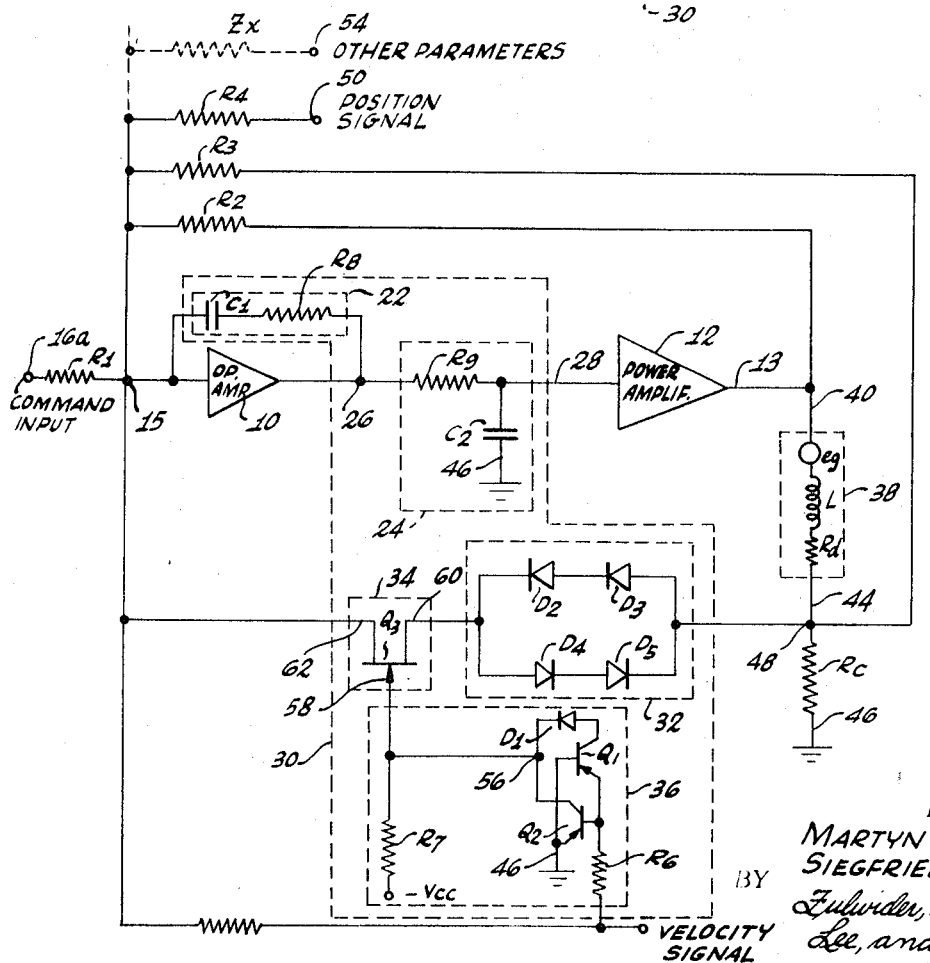
FIG. 2 is a combined block diagram and electrical schematic of the feedback control system of the present invention showing electrical circuit details of the controlled feedback loop incorporated in a preferred embodiment for use with a moving inductance type linear actuator system.

FIG. 2 shows a presently preferred embodiment of the variable mode feedback control system of the invention for use with a "voice coil" type linear actuator in a magnetic disc memory system. The operational amplifier 10 and power amplifier 12 are the same as in FIG. 1. As is well known in the art, such an actuator includes a coil 38 which moves in a cylindrical air gap between two magnetic poles in response to an electronic current through the coil. An equivalent circuit for such a coil 38, as shown in FIG. 2, includes an inductor L, a distributed resistance $R_d$ and a source of counter e.m.f., $e_v$, which varies with the velocity of the coil. One end 40 of the coil 38 is connected to the output 13 of the power amplifier 12 and another end 44 is connected to a system ground point 46 through a current sensing resistor $R_c$, the current through the coil being the primary controlled parameter of the system.

As discussed above, the error signal input to the operational amplifier 10 formed at the summing point 15 is a combination of a number of feedback signals. For example, in the illustrated preferred embodiment, a command input 16a is fed through a resistor $R_1$ to the summing point 15, the power amplifier output 13 is fed to the summing point through a resistor $R_2$ and a coil current signal, developed across the current sensing resistor $R_c$, is fed on a line 48 through a resistor $R_3$ to the summing point. Additionally, a coil position signal on a line 50 is fed to the summing point 15 through a resistor $R_4$ and a velocity signal on a line 52 is fed to the summing point through a resistor $R_5$. Depending on the actual system application, signals indicative of other parameters may be fed by a line 54 to the summing point 15 through one or more generalized impedances $Z_x$.

In a practical magnetic disc memory system, when data is being written or read, the coil 38 of the actuator is substantially immobile and any small positional changes due to vibration or the like are compensated for by relatively small corrective currents supplied by the feedback control system incorporating the present invention. These correctional currents are so small as to produce no measurable indication of velocity of the coil 38. From a practical standpoint, any current through the coil 38, however small, which results in a measurable indication of velocity means that the actuator has been commanded to a new position which is a relatively large distance from the old position. Under such conditions, the memory system is normally not reading or writing data and it may be desirable to enable the control system to change to the pulse-width modulation mode. Therefore, in the presently preferred embodiment of the feedback control system of the present invention shown in FIG. 2, a velocity signal on line 52 from a coil velocity sensor of conventional design is used to activate the pulse-width modulation enable network 36.

In the actuator system in which the preferred embodiment of the control system is used, velocities in either of two directions are indicated by positive or negative voltages. The pulse-width modulation enable network 36 therefore comprises a bipolar comparator responsive to threshold voltages of either polarity. The comparator includes a pair of transistors $Q_1$ and $Q_2$ with their base-emitter circuits connected back to back. The base of transistor $Q_1$ and the emitter of transistor $Q_2$ are both tied to the ground point 46, and the emitter of transistor $Q_1$ and base of transistor $Q_2$ are both connected through a threshold-level determining resistor $R_6$ to the velocity signal line 52. The particular positive or negative threshold voltage at which the bipolar comparator triggers is determined by the value of resistor $R_6$ and the characteristics of the base-emitter circuits of the transistors $Q_1$ and $Q_2$. To compensate for the oppositely connected base-emitter circuits of transistors $Q_1$ and $Q_2$, the collector of transistor $Q_1$ is connected through a voltage compensating diode $D_1$ to the collector of transistor $Q_2$ and their common junction point 56 is connected through a resistor $R_7$ to a source of negative voltage $-V_{cc}$.

When the voltage level of the velocity signal on line 52 is below the positive threshold voltage, or above the negative threshold voltage, transistors $Q_1$ and $Q_2$ remain cutoff so that their collector voltages are at substantially $-V_{cc}$. When the velocity signal on the line 52 from the velocity sensor reaches the predetermined positive or negative threshold voltage, transistor $Q_1$ or transistor $Q_2$, respectively, rapidly switches from the cutoff to the saturated state raising the voltage at the junction point 56 from approximately $-V_{cc}$ to approximately zero volts.

The junction point 56 is connected to a gate electrode 58 of a field-effect transistor $Q_3$ which serves as the gate 34 (FIG. 1) of the controlled feedback loop 30 of the control system. The field-effect transistor $Q_3$ is of the N-channel depletion type so that the negative potential $-V_{cc}$ applied to the gate electrode 58 when the comparator is not activated maintains the field-effect transistor in a cutoff condition to maintain the controlled feedback loop 30 in an open circuited condition. When the bipolar comparator is triggered by the positive or negative velocity signal on line 52, the gate electrode 58 of the field-effect transistor $Q_3$ is brought to approximately a zero voltage level lowering the source 60 to drain 62 resistance of the field-effect transistor to substantially zero to close the controlled feedback loop 30 of the control system.

While the comparator circuit and field-effect transistor $Q_3$ were conveniently chosen for the presently preferred embodiment, it should be noted that a wide variety of threshold and gate circuits might be chosen, depending on the requirements of a particular application of the control system of the present invention.

While an indication of a particular velocity of the coil 38 of the actuator indicates that it may be desirable to switch the control system into the pulse-width modulation mode, the actual magnitude of the primary controlled parameter, or current, through the coil determines when it is necessary to initiate that mode. As shown in FIG. 2, the initiate network 32 of FIG. 1 comprises a back-to-back string of series connected diodes $D_2-D_3$, $D_4-D_5$ connected between the current signal line 48 and the source 60 to drain 62 circuit of the field-effect transistor $Q_3$. Thus, the current signal developed across resistor $R_c$ must reach a positive or negative voltage determined by the sum of the forward voltage drops of the diode strings $D_2-D_3$, $D_4-D_5$, respectively, before the current signal is fed through the initiate network 32 to the summing point 15 of the operational amplifier 10. Then, any further voltage increase of the current signal on line 48 is applied directly to the summing point 15. While the series diode strings $D_2-D_3$, $D_4-D_5$ were conveniently chosen as the initiate network 32 (FIG. 1) for the presently preferred embodiment, it will again be appreciated that a wide variety of threshold circuits could be employed for the same or other applications.

It is well known that an inductance such as the inductor L of the coil 38 shown in FIG. 2 introduces a phase lag between the voltage across the inductor and the current through it. The current signal developed across the resistor $R_c$ is then lagging in phase behind the voltage appearing at the output 13 of the power amplifier 12. In order to cause the current signal on line 48 to be positive for particular ranges of frequencies, additional phase-lag circuits, corresponding to the phase shift networks 22, 24 of FIG. 1, are connected between the output 26 of the operational amplifier 10 and the summing point 15 and between the output of the operational amplifier and the input 28 to the power amplifier 12. While any number of particular phase lag circuits may be chosen for the networks 22, 24, a relatively simple series resistor $R_8$ and capacitor $C_1$ is utilized for the network 22 between the output 26 of the operational amplifier 10 and the summing point 15. Another relatively simple series resistor $R_9$ and parallel capacitor $C_2$ connected to the ground point 46 is utilized for the network 24 between the output 26 of the operational amplifier 10 and the input 28 to the power amplifier 12.

The total phase lag of the inductor L of the coil 38 and the phase shift networks 22, 24 results in positive feedback of the current feedback signal through this complete system for frequencies which are chosen to be relatively high compared to the bandwidth of the total control system, as discussed above.

As the current through the coil 38, indicated by the current signal on line 48, or the velocity of the coil, indicated by the velocity signal on line 52, decreases below the predetermined threshold levels, for example, either the initiate network 32 or the enable network 36 of FIG. 1 is deactivated, opening the controlled feedback loop 30 for the control system and switching it back to the linear mode again, as discussed above.

Thus, it will be appreciated that the mode of the feedback control system of the present invention may be switched from the linear to the pulse-width modulation mode with a relatively simple additional controlled feedback loop 30 utilizing relatively few circuit components. It will also be appreciated that many variations on the basic pulse-width modulation enable and initiate networks 36, 32 and their implementing circuitry may be made and still be within the scope of the present invention. Therefore, the scope of the present invention is not to be limited except by the following claims.

We claim:

1. A feedback control system, comprising:
   amplifier means for supplying controlled power to a load, said amplifier means being normally operable in a stable, substantially linear mode;
   sensing means connected to said load for sensing particular load parameters; and
   controlled feedback means for causing said amplifier means to operate in an oscillatory mode by means of phase shifts within said amplifier means in response to predetermined conditions of said load parameters, said controlled feedback means being connected between said sensing means and the input to said amplifier means for applying a signal from said sensing means to said input to said amplifier means.

2. A feedback control system as defined in claim 1, wherein:
   said oscillatory mode of said amplifier means defines a pulse-width modulation mode for said amplifier means.

3. A feedback amplifier control system as defined in claim 2, wherein:
   only one of said particular load parameters controls the pulse-width modulation mode of said amplifier means through said controlled feedback means.

4. A feedback control system as defined in claim 3, wherein:
   said one particular load parameter is the primary load parameter controlled by said amplifier means.

5. A feedback control system, comprising:
   amplifier means for supplying controlled power to a load, said amplifier means being normally operable in a stable, substantially linear mode;
   sensing means connected to said load for sensing particular load parameters; and
   controlled feedback means for causing said amplifier means to operate in an oscillatory mode in response to predetermined conditions of said load parameters, said controlled feedback means being connected between said sensing means and the input to said amplifier means for applying a signal from said sensing means to said input to said amplifier means, said controlled feedback means including phase shift means for shifting the phase of the signal applied to said input to said amplifier means so that said signal is in the proper phase to cause said amplifier means to operate in said oscillatory mode.

6. A feedback control system as defined in claim 5, wherein:
   said signal is in the proper phase to cause said amplifier means to operate in said oscillatory mode over a preselected range of frequencies determined at least in part by said phase shift means.

7. A feedback control system as defined in claim 6, wherein:
   said oscillatory mode of said amplifier means defines a pulse-width modulation mode for said amplifier means.

8. A feedback amplifier control system as defined in claim 7, wherein:
   only one of said particular load parameters controls the pulse-width modulation mode of said amplifier means through said controlled feedback means.

9. A feedback control system as defined in claim 8, wherein:
   said one particular load parameter is the primary load parameter controlled by said amplifier means.

10. A feedback control system, comprising:
    amplifier means for supplying controlled power to a load, said amplifier means being normally operable in a stable, substantially linear mode, said amplifier means mainly controlling one particular load parameter;
    sensing means connected to said load for sensing particular load parameters, said sensing means generating a signal indicative of the condition of said one particular load parameter;
    controlled feedback means for causing said amplifier means to operate in an oscillatory mode in response to predetermined conditions of said load parameters, said controlled feedback means being connected between said sensing means and the input to said amplifier means for applying a signal from said sensing means to said input to said amplifier means, said controlled feedback means including a series circuit with a gate between the source of said signal and said input to said amplifier means, said controlled feedback means further including an enabling network connected to said gate for enabling said gate in response to predetermined conditions of others of said particular load parameters.

11. A feedback control system as defined in claim 10, wherein:
    said oscillatory mode of said amplifier means defines a pulse-width modulation mode for said amplifier means.

12. A feedback amplifier control system as defined in claim 11, wherein:
    only one of said particular load parameters controls the pulse-width modulation mode of said amplifier means through said controlled feedback means.

13. A feedback control system as defined in claim 12, wherein:
    said controlled feedback means includes phase shift means for shifting the phase of the signal applied to said input to said amplifier means so that said signal is in the proper phase to cause said amplifier means to operate in said oscillatory mode.

14. A feedback control system as defined in claim 13, wherein:
    said signal is in the proper phase to cause said amplifier means to operate in said oscillatory mode over a preselected range of frequencies determined at least in part by said phase shift means.

15. A feedback control system comprising:
    power amplifier means for supplying controlled power to a load, said power amplifier means having an input and an output;
    a load having a moving inductance type driven element, the output of said amplifier means being connected to said load and the current through said load lagging in phase behind the voltage across said load;

operational amplifier means for driving said power amplifier means, the output of said operational amplifier means being connected to the input of said power amplifier means through a first phase lag electrical network, the output of said operational amplifier means being further connected to the input of said operational amplifier means through a second phase lag electrical network, the input to said operational amplifier means defining a summing point;

sensing means connected to said load for sensing particular load parameters, including a means for sensing load current;

feedback means connected between said sensing means and said summing point for stabilizing said system to operate in a substantially linear mode; and controlled feedback means for causing said system to operate in an oscillatory mode, said controlled feedback means being connected between said load current sensing means and said summing point, said controlled feedback means being enabled by a predetermined condition of a preselected particular parameter of said load.

16. A feedback control system as defined in claim 15, wherein:
said oscillatory mode of said system defines a pulse-width modulation mode for said power amplifier means.

17. A feedback control system as defined in claim 15, wherein:
the sum of the phase lags of said load and said first and second phase lag electrical networks is such that the feedback signal due to the load current applied to said input of said power amplifier means through said controlled feedback means is positive over a preselected range of frequencies to produce an oscillatory condition in said power amplifier means defining a pulse-width modulation mode for said system when said controlled feedback means is enabled.

18. A feedback control system as defined in claim 17, wherein:
the frequency range of oscillations of said power amplifier means is sufficiently higher than the bandwidth characteristics of said feedback control system so that the current through said load is substantially averaged; and
said average current through said load is at least partially determinative of the exact frequency of oscillation of said power amplifier means.

19. A feedback control system as defined in claim 15, wherein:
said load current sensing means produces a voltage proportional to the load current; and
said controlled feedback means includes a voltage threshold device connected in series with an electrical gate between said load current sensing means and said summing point, said gate being enabled by said predetermined condition of a preselected particular parameter of said load, said oscillatory mode of said system being initiated when said voltage proportional to said load current exceeds the threshold voltage of said threshold device.

20. A feedback control system as defined in claim 19, wherein:
said oscillatory mode of said system defines a pulse-width modulation mode for said power amplifier means.

21. A feedback control system as defined in claim 19, wherein:
the sum of the phase lags of said load and said first and second phase lag electrical networks is such that the feedback signal due to the load current applied to said input of said power amplifier means through said controlled feedback is positive over a preselected range of frequencies to produce an oscillatory condition in said power amplifier means defining a pulse-width modulation mode for said system when said controlled feedback means is enabled.

22. A feedback control system as defined in claim 21, wherein:
the frequency range of oscillations of said power amplifier means is sufficiently higher than the bandwidth characteristics of said feedback control system so that the current through said load is substantially averaged; and
said average current through said load is at least partially determinative of the exact frequency of oscillation of said power amplifier means.

23. A feedback control system as defined in claim 22, wherein:
said load is a linear actuator including an actuator coil and said one particular load parameter is the velocity of said coil.

24. A feedback control system as defined in claim 23, wherein:
said controlled feedback means includes a second threshold device connected to said sensing means and said gate, said gate being enabled when a coil velocity signal from said sensing means exceeds the threshold level of said second threshold device.

25. A feedback control system as defined in claim 19, wherein:
said load is a linear actuator including an actuator coil and said one particular load parameter is the velocity of said coil.

26. A feedback control system as defined in claim 25, wherein:
said controlled feedback means includes a second threshold device connected to said sensing means and said gate, said gate being enabled when a coil velocity signal from said sensing means exceeds the threshold level of said second threshold device.

* * * * *

PO-1050
(5/69)

UNITED STATES PATENT OFFICE
CERTIFICATE OF CORRECTION

Patent No. 3,665,500      Dated May 23, 1972

Inventor(s) LEWIS ET AL

It is certified that error appears in the above-identified patent and that said Letters Patent are hereby corrected as shown below:

Column 6, Line 59, before "respectively," delete "$D_2-D_{3a}$, $D_4-D_5$" and insert therefor

--$D_2-D_3$, $D_4-D_5$--.

Signed and sealed this 12th day of September 1972.

(SEAL)
Attest:

EDWARD M. FLETCHER, JR.
Attesting Officer

ROBERT GOTTSCHALK
Commissioner of Patents